United States Patent
Hashimoto et al.

(10) Patent No.: US 6,221,219 B1
(45) Date of Patent: Apr. 24, 2001

(54) MAGNETO-OPTICAL MEDIUM AND PROCESS FOR PRODUCTION THEREOF

(75) Inventors: Morimi Hashimoto, Wako; Tsutomu Shiratori, Tokyo, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/406,692

(22) Filed: Sep. 27, 1999

(30) Foreign Application Priority Data

Sep. 28, 1998 (JP) .................................................. 10-273300

(51) Int. Cl.⁷ .............................. C23C 14/34; G11B 13/00
(52) U.S. Cl. ................................. 204/192.2; 204/192.15; 204/192.32; 204/192.34; 428/64.3; 428/141; 428/212; 428/900; 428/694 ML; 428/694 MM; 427/130; 427/131; 369/13
(58) Field of Search ........................... 204/192.15, 192.2, 204/192.32, 192.34; 428/64.3, 141, 212, 900, 694 ML, 694 MM; 427/130, 131; 369/13

(56) References Cited

U.S. PATENT DOCUMENTS 5,936,915   8/1999   Fujii et al. ............................ 369/13

FOREIGN PATENT DOCUMENTS

| 618572 | * | 10/1994 | (EP) . |
| 6-290496 | | 10/1994 | (JP) . |
| 9-289719 | | 11/1997 | (JP) . |
| 11-191245 | * | 7/1999 | (JP) . |
| 11-195252 | * | 7/1999 | (JP) . |

* cited by examiner

*Primary Examiner*—Alan Diamond
(74) *Attorney, Agent, or Firm*—Fitzpatrick, Cella, Harper & Scinto

(57) ABSTRACT

A magneto-optical medium comprises a light-transmissive substrate, a third magnetic layer formed on the light-transmissive substrate, a first magnetic layer formed on the light-transmissive substrate, the first magnetic layer having lower domain wall coercivity and allowing higher domain wall mobility than the third magnetic layer at or around an ambient temperature and a second magnetic layer held between the first magnetic layer and the third magnetic layer, the second magnetic layer having a Curie temperature lower than that of the first magnetic layer and the third magnetic layer, wherein the surface roughness, Ra(d), of the first magnetic layer is smaller than the surface roughness, Ra(m), of the third magnetic layer.

11 Claims, 1 Drawing Sheet

MAGNETO-OPTICAL MEDIUM AND PROCESS FOR PRODUCTION THEREOF

BACKGROUND OF THE INVENTION

1. Field of the Invention

The present invention relates to a magneto-optical medium which records information in an ultrahigh density and reproduces the information by utilizing displacement of a magnetic domain wall. The present invention relates also to a process for producing the magneto-optical medium.

2. Related Background Art

In recent years, magneto-optical disks are attracting attention as a rewritable high-density recording medium. However, the magneto-optical medium is required to be capable of memorizing information in higher density for a larger memory capacity. The linear memory density of the optical disk depends on the laser wavelength $\lambda$ and the numerical aperture NA of the objective lens of the reproducing optical system. The detectable spatial frequency in signal reproduction is limited to about $NA/\lambda$.

For a higher memory density of a conventional optical disk, the laser wavelength $\lambda$ should be made shorter, and the numerical aperture NA of the objective lens should be larger. However, the improvements in the laser wavelength and of the numerical aperture of the objective lens are naturally limited. Thus, several techniques for increasing the memory density by improving the constitution of the recording medium or the read-out method are disclosed.

For example, the inventor of the present invention disclosed, in Japanese Patent Application Laid-Open No. 6-290496, a magneto-optical medium capable of reproducing signals of a frequency of less than an optical diffraction limit at a high speed, a reproduction system and a reproduction apparatus therefor. In the reproduction layer of the disclosed magneto-optical medium, the magnetic domain walls are displaced toward a portion of lower domain wall energy by causing a temperature distribution by means of a heating means such as a light beam, owing to formation of distribution of the domain wall energy. Accordingly, the amplitude of the reproduced signals is constant and maximal independently of the interval of recorded domain walls (i.e., recording bit length). Accordingly, by this feature, the extent of reduction in reproduction output, which is accompanied inevitably with increase of the linear memory density, is decreased, and further higher memory density is achievable.

The inventors of the present invention disclosed, in Japanese Patent Application No. 9-289719, now Japanese Patent Publication 11-191245, control of the surface roughness of the magnetic layer (i.e., substrate surface) to be small to facilitate the displacement of the magnetic domain in the displacement layer in the constitution of the medium disclosed in the aforementioned Japanese Patent Application Laid-Open No. 6-290496. According to the disclosure, the surface roughness of the substrate is directly reflected to the surface roughness of the displacement layer. The smaller the surface roughness, the more the mobility of domain walls is increased because the surface roughness retards the displacement of the domain walls.

However, although the above disclosed technique is effective for facilitating the domain wall displacement, the surface roughness of the memory layer also becomes less, which lower undesirably both the coercivity of the memory layer and the preservability of the domains which is the inherent role of the memory layer. The drop of the magnetic domain preservability is a serious problem, particularly in recording in finer domains.

SUMMARY OF THE INVENTION

After comprehensive study, the inventors of the present invention solved the above problem by constituting and producing the medium by decreasing the surface roughness of the displacement layer and simultaneously increasing the surface roughness of the memory layer. Thus the present invention has been completed.

The present invention intends to provide a magneto-optical medium of a domain wall displacement type having improved domain preservability of the memory layer.

The magneto-optical medium of the present invention comprises a light-transmissive substrate; a third magnetic layer formed on the light-transmissive substrate; a first magnetic layer formed on the light-transmissive substrate, the first magnetic layer having lower domain wall coercivity and allowing higher domain wall mobility than the third magnetic layer at and around an ambient temperature; and a second magnetic layer held between the first magnetic layer and the third magnetic layer, the second magnetic layer having a Curie temperature lower than those of the first magnetic layer and the third magnetic layer, wherein the surface roughness, Ra(d), of the first magnetic layer is smaller than the surface roughness, Ra(m), of the third magnetic layer.

The process for producing the magneto-optical medium of the present invention comprises the steps of forming a first magnetic layer on a light-transmissive substrate, forming a second magnetic layer on the first magnetic layer, roughening the surface of the second magnetic layer, and forming a third magnetic layer on the surface-roughened second magnetic layer.

DESCRIPTION OF THE PREFERRED EMBODIMENTS

Figure 1:
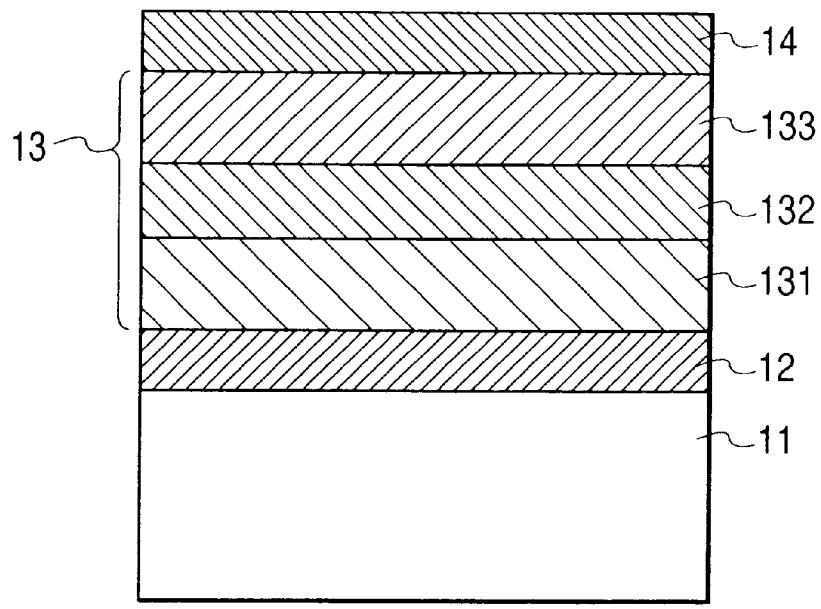
FIG. 1 is a schematic sectional view showing layer constitution of the magneto-optical medium employed in Examples 1–7 of the present invention.

The magneto-optical medium of the present invention comprises at least a first magnetic layer, a second magnetic layer, and a third magnetic layer formed by successive lamination. The first magnetic layer is a magnetic layer (serving as a displacement layer and a reproduction layer) having a lower domain wall coercivity and a higher domain wall mobility than those of the third magnetic layer at and around an ambient temperature; the second magnetic layer is a magnetic layer (serving as a switching layer) having a lower Curie temperature than that of the first magnetic layer and the third magnetic layer, and the third magnetic layer is a conventional magnetic recording layer (serving as a memory layer, having the same layer constitution as that disclosed in Japanese Patent Application Laid-Open No. 6-290496) having sufficient domain preservability, wherein the surface roughness, Ra(d), of the first magnetic layer is smaller than the surface roughness, Ra(m), of the third magnetic layer (Ra(d)<Ra(m)).

In another embodiment of the present invention, the third magnetic layer has preferably a surface roughness, Ra(m) of not less than 1.2 nm.

In still another embodiment of the present invention, the first magnetic layer has a surface roughness, Ra(d), of not more than 1.2 nm, and the third magnetic layer has a surface roughness Ra(m) of not less than 1.2 nm.

The surface roughnesses of the first and the third magnetic layers are made different by forming, on a substrate having a smaller surface roughness (Ra<1.2 nm), the first magnetic layer (displacement layer) by sputtering (to form a film for higher mobility of the domain walls), and then forming the third magnetic layer (memory layer) by any of the methods below:

(1) before formation of the memory layer, the surface of the underlying layer (here, the second magnetic layer) is roughened by inversed sputtering;

(2) before formation of the memory layer, the surface of the underlying layer (here, the second magnetic layer) is roughened by ion beam milling;

(3) in an early stage of formation of the memory layer, protrusions are formed like islands by sputtering at a higher gas pressure;

(4) the memory layer itself is formed by sputtering at a higher gas pressure;

(5) the memory layer is formed by sputtering by employing Kr, Xe, or Ne, or a gas mixture thereof in place of or in addition to Ar;

(6) in the inversed sputtering before the memory layer formation, Kr, Xe, or Ne, or a gas mixture thereof is employed in place of or in addition of Ar;

and the like methods.

In another technique, on a substrate having a usual surface roughness (Ra>1.2 nm), the layers are formed in a reverse order (i.e., substrate/memory layer/switching layer/displacement layer), and before formation of the displacement layer, the surface is smoothened by inversed sputtering, ion beam milling, or a like method.

In a still another technique, the surface of a substrate having a usual surface roughness (Ra>1.2 nm) is smoothened by inversed sputtering, ion beam milling, or a like method, and before formation of the memory layer, a surface of the underlying layer is roughened by inversed sputtering, ion beam milling, or a like method.

The inversed sputtering and the ion beam sputtering serve usually to roughen the smooth surface of the substrate and magnetic layer, whereas it can serve to smoothen a rough surface of the substrate and magnetic layer under a specific conditions.

By differentiating the surface roughness (Ra(d)) of the displacement layer and the surface roughness (Ra(m)) of the memory layer with the above technique to obtain the relation of Ra(d)<Ra(m), the mobility of the domain walls in the displacement layer is improved, and concurrently the preservability of the domain in the memory layer is also improved. Further improvement can be achieved under the conditions of Ra(d)<Ra(m), and simultaneously Ra(m)≧1.2 nm and Ra(d)≦1.2 nm.

Embodiments of the present invention is described below in detail by reference to examples and drawings, without limiting the invention in any way.

FIG. 1 is a schematic sectional view showing layer constitution of the magneto-optical medium of the present invention.

First dielectric layer 12, magnetic layer 13, and second dielectric layer 14 are successively formed on light-transmissive substrate 11.

Light-transmissive substrate 11 may be formed from a material such as glass, polycarbonate, polymethyl methacrylate, and thermoplastic norbornene resins.

Magnetic layer 13 is preferably comprised of three or more constitutional layers as disclosed in Japanese Patent Application Laid-Open No. 6-290496. First magnetic layer 131 is a magnetic layer (serving as a displacement layer and a reproduction layer) having a lower domain wall coercivity and a higher domain wall mobility relative to third magnetic layer 133 at and around an ambient temperature. Second magnetic layer 132 is a magnetic layer (serving as a switching layer) having a lower Curie temperature than those of first magnetic layer 131 and third magnetic layer 133. Third magnetic layer 133 is a conventional magnetic recording layer (serving as a memory layer) excellent in magnetic domain preservability.

The respective magnetic layers are formed continuously by a physical vapor deposition such as sputtering and vacuum vapor deposition to be coupled to each other by exchange coupling or magnetostatic coupling.

Magnetic layer 131 is preferably formed from a material for bubble memories such as rare earth-iron type amorphous alloys having relatively low magnetic anisotropy including alloys of a GdCo type, a GdFe type, a GdFeCo type, and a TbCo type; and garnet.

Magnetic layer 132 is preferably formed from a material such as a Co-type or a Fe type alloy having a Curie temperature lower than those of magnetic layer 131 and magnetic layer 133, and having a saturation magnetization value lower than that of magnetic layer 133. The Curie temperature can be adjusted by the addition amount of Co, Cr, Ti, or the like.

Magnetic layer 133 is formed preferably from a material of high saturation magnetization and high magnetic anisotropy, and capable of preserving a magnetization state (magnetic domains) stably, the material including rare earth-iron group type amorphous alloys such as TbFeCo, DyFeCo, and TbDyFeCo; platinum group-iron group type periodic structure films such as Pt/Co and Pd/Co.

Dielectric layers 12, 14 are formed from SiN, $SiO_2$, ZnS, or the like, but is not limited thereto. In the aforementioned magnetic layers, tracks are magnetically divided by selecting the shape of the substrate or partial annealing of the magnetic layer in order to enable the displacement of the domain walls in the displacement layer.

The inversed sputtering or the ion beam milling before formation of the memory layer or the displacement layer is conducted by a conventional method for film formation without a special modification of the process.

The surface roughness of substrate 11 and magnetic layers 13 was measured with scanning probe microscope (SPM), Nanoscope III (manufactured by Digital Instruments Co., U.S.A.), at a tapping mode AFM. The probe was an ordinary blade tip. The surface roughness was represented by the value of Ra (average center roughness).

The present invention is described below in more detail by reference to specific examples without limiting the invention thereto in any way.

[Example 1]

FIG. 1 is a schematic sectional view showing layer constitution of the magneto-optical medium of the present invention. In FIG. 1, polycarbonate substrate 11 is a land-and-groove type substrate having a land width of 0.6 μm, a groove width of 0.6 μm, and a channel depth of 85 nm.

The surface roughness Ra of the land portion of substrate 11 was found to be 1.250 nm.

In a DC magnetron sputtering apparatus, targets of B-doped Si, Gd, Tb, Fe, Co, and Cr were set respectively, and substrate 11 was fixed to a substrate holder. After the sputtering chamber was evacuated to a back pressure of $1 \times 10^{-5}$ Pa or a higher vacuum, gaseous Ar was introduced thereto to a pressure of 0.3 Pa.

Then, the surface of substrate 11 was treated by inversed sputtering at an input power of 100 W for 5 minutes.

After the inversed sputtering, the surface roughness Ra of substrate 11 was found to be 0.835 nm. Thus, the surface of substrate 11 was smoothened by the inversed sputtering treatment before the layer formation.

Subsequently, on substrate 11, were formed successively SiN layer 12 as the first dielectric layer (interference layer) in a thickness of 80 nm, GdFeCr layer 131 as the first magnetic layer (domain displacement layer) in a thickness of 30 nm, and TbFeCr layer 132 as the second magnetic layer (switching layer) in a thickness of 10 nm. The surface roughness Ra of magnetic layer 132 was found to be 0.835 nm. Thus, the surface roughness of the reverse-sputtered substrate 11 was reflected on the surface roughness of the magnetic layer.

Then, the surface of second magnetic layer 132 was treated by inversed sputtering at an input power of 100 W for 5 minutes. Thereby, the surface roughness Ra was changed to 1.330 nm. On this surface, TbFeCoCr layer 133 was formed by sputtering as the third magnetic layer (memory layer) in a thickness of 80 nm. The surface roughness Ra thereof was found to be 1.225 nm. Thus a medium was formed which has the surface roughness of the memory layer greater than that of the displacement layer.

Thereon, SiN layer 14 was formed as the second dielectric layer (protection layer) in a thickness of 60 nm.

The magnetic layers of the obtained magneto-optical disk were annealed by laser at the groove face in order to divide it into tracks magnetically.

With the resulting magneto-optical disk, recording was conducted continuously on the land face thereof by an ordinary field-modulation system at a mark length of 0.05 $\mu$m, and a pit interval of 0.10 $\mu$m. The recorded information was reproduced by the technique of "Enlarging Reproduction Process of Magnetic Domain Displacement Type Utilizing Temperature Gradient in Magnetic Layer" disclosed by the inventors of the present invention (Japanese Patent Application Laid-Open No. 6-290496). The reproduction was conducted with an optical system of a wavelength of 680 nm and NA of 0.6 (relative speed 2 m/s) at a C/N value of 39.0 dB with high reproducibility.

As described above, recording and reproduction could be conducted readily and stably even with a fine marks of 0.05 $\mu$m long by use of a recording medium having a smooth displacement layer (surface roughness of 1.2 nm or less) and a rough memory layer (surface roughness of 1.2 nm or more) formed after forming the displacement layer by inversed sputtering with surface treatment. In other words, the displacement layer having a small surface roughness (not more than 1.2 nm) facilitates the displacement of the domain walls, and the memory layer having a large roughness (not less than 1.2 nm) has an improved coercivity to improve effectively the preservability of the recorded magnetic domains.

[Comparative Example 1]

A magneto-optical disk was prepared in the same manner as in Example 1 except that the inversed sputtering was not conducted before the memory layer formation.

The magnetic layers of the obtained magneto-optical disk were annealed by laser at the groove face in the same manner as in Example 1 in order to divide it into tracks magnetically.

With the magneto-optical disc thus obtained, recording was conducted continuously on the land face thereof by ordinary field-modulation system at a mark length of 0.05 $\mu$m, and a pit interval of 0.10 $\mu$m. The recorded information was reproduced by the technique of "Enlarging Reproduction Process of Magnetic Domain Displacement Type Utilizing Temperature Gradient in Magnetic Layer" disclosed by the inventors of the present invention (Japanese Patent Application Laid-Open No. 6-290496). The reproduction was conducted with an optical system of a wavelength of 680 nm and NA of 0.6 (relative speed: 2 m/s). However, the C/N value was as low as 32.0 dB or lower, which was not sufficient for practical use.

According to polarization microscopy observation of the recorded fine domains, some of the magnetic domains were joined together scatteringly and the prescribed marks were not recorded stably. This is considered to be caused by the fact that, in the memory layer formation, the insufficient surface roughness, (i.e. excess smoothness) decreases the coercivity of the momory layer to lower the preservability of the magnetic domains.

As shown above, it was found that the marks as fine as 0.05 $\mu$m long could not be perfectly recorded in the case where the displacement layer was formed to be smooth (surface roughness not larger than 1.2 nm) by employing an inversed sputtering process and later the memory layer was formed to be smooth also (surface roughness not larger than 1.2 nm).

[Example 2]

Polycarbonate substrate 11 employed was a land-and-groove type substrate having a smooth surface and having a land width of 0.6 $\mu$m, a groove width of 0.6 $\mu$m, and a channel depth of 85 nm. The surface roughness Ra of the land portion of substrate 21 was found to be 0.525 nm.

On this polycarbonate substrate 11, the magnetic layers and the dielectric layers were formed in the same manner as in Example 1 except that the substrate was not treated by inversed sputtering before the layer formation. Thus the surface regarding the switching layer was treated for roughening only before formation of the memory layer by inversed sputtering. After the inversed sputtering, the surface roughness Ra was found to be 1.305 nm.

The magnetic layers of the obtained magneto-optical disk were annealed by laser at the groove face in order to divide it into tracks magnetically.

With the resulting magneto-optical disk, recording was conducted continuously on the land face thereof by an ordinary field-modulation system at a mark length of 0.05 $\mu$m, and a pit interval of 0.10 $\mu$m. The recorded information was reproduced by the technique of "Enlarging Reproduction Process of Magnetic Domain Displacement Type Utilizing Temperature Gradient in Magnetic Layer" disclosed by the inventors of the present invention (Japanese Patent Application Laid-Open No. 6-290496). The reproduction was conducted with an optical system of a wavelength of 680 nm and NA of 0.6 (relative speed 2 m/s) at a C/N value of 39.5 dB with high reproducibility.

As the results, recording and reproduction could be conducted readily and stably even with a fine marks of 0.05 $\mu$m long on a recording medium having a roughened memory layer (surface roughness of 1.2 nm or more) formed after inversed sputtering treatment. In other words, the displacement layer having a small surface roughness (not more than 1.2 nm) facilitates the displacement of the domain walls, and the memory layer having a large roughness (not less than 1.2 nm) has an improved coercivity to improve effectively the preservability of the recording magnetic domains.

[Comparative Example 2]

A magneto-optical disk was prepared in the same manner as in Example 2 except that the inversed sputtering was not conducted before the memory layer formation.

The magnetic layers of the obtained magneto-optical disk were annealed by laser at the groove face in the same manner as in Example 1 in order to divide it into tracks magnetically.

With the resulting magneto-optical disk, recording was conducted continuously on the land face thereof by an ordinary field-modulation system at a mark length of 0.05 µm, and a pit interval of 0.10 µm. The recorded information was reproduced by the technique of "Enlarging Reproduction Process of Magnetic Domain Displacement Type Utilizing temperature Gradient in Magnetic Layer" disclosed by the inventors of the present invention (Japanese Patent Application Laid-Open No. 6-290496). The reproduction was conducted with an optical system of a wavelength of 680 nm and NA of 0.6 (relative speed: 2 m/s). However, the C/N value was as low as 33.0 dB, which was not sufficient for practical use.

According to polarization microscopy observation of the recorded fine domains, some of the magnetic domains were joined together scatteringly and desired marks were not recorded stably. This is considered to be caused by the fact that, in formation of the memory layer, the insufficient surface roughness, (i.e. excess smoothness) decreases the coercivity of the magnetic layer to lower the preservability of the magnetic domains.

As shown above, it was found that the marks as fine as 0.05 µm long could not be perfectly recorded in the case where the memory layer was formed to be smooth (surface roughness: not more than 1.2 nm) similarly as the displacement layer.

[Example 3]

The layers were formed on the same substrate in the same manner as in Example 2 except that the Ar pressure was controlled to 0.3 Pa for the layers other than the memory layer and 0.8 Pa for the memory layer and the inversed sputterings were not conducted.

The magnetic layers of the obtained magneto-optical disk were annealed by laser at the groove face in order to divide it into tracks magnetically.

With the resulting magneto-optical disk, recording was conducted continuously on the land face thereof by ordinary field-modulation system at a mark length of 0.05 µm, and a pit interval of 0.10 µm. The recorded information was reproduced by the technique of "Enlarging Reproduction Process of Magnetic Domain Displacement Type Utilizing Temperature Gradient in Magnetic Layer" disclosed by the inventors of the present invention (Japanese Patent Application Laid-Open No. 6-290496). The reproduction was conducted with an optical system of a wavelength of 680 nm and NA of 0.6 (relative speed 2 m/s) at a C/N value of 38.5 dB with high reproducibility.

As described above, the memory layer was improved in the coercivity and the recorded domain preservability by a simple method that the Ar pressure is made higher in memory layer formation than in other magnetic layer formations.

[Example 4]

The layers were formed on the same substrate in the same manner as in Example 3 except that the Ar pressure was controlled to 0.3 Pa for the layers other than the memory layer, 2 Pa in the early stage (corresponding to ⅓ thickness) of the memory layer formation, and 0.5 Pa in the later stage (corresponding to ⅔ thickness) of the memory layer formation.

By raising the gas pressure in the early stage of the memory layer formation, deposits were formed like islands to roughen the surface effectively.

The inversed sputterings were not conducted similarly as in Example 3.

The magnetic layer of the obtained magneto-optical disk was annealed by laser at the groove face in order to divide it into tracks magnetically.

With the magneto-optical disc thus obtained, recording was conducted continuously on the land face thereof by ordinary field-modulation system at a mark length of 0.05 µm, and a pit interval of 0.10 µm. The recorded information was reproduced by the technique of "Enlarging Reproduction Process of Magnetic Domain Displacement Type Utilizing Temperature Gradient in Magnetic Layer" disclosed by the inventors of the present invention (Japanese Patent Application Laid-Open No. 6-290496). The reproduction was conducted with an optical system of a wavelength of 680 nm and NA of 0.6 (relative speed 2 m/s) at a C/N value of 38.8 dB with high reproducibility.

As described above, island-like protrusions were formed to roughen the surface effectively by controlling the Ar pressure in memory layer formation higher than in other magnetic layer formations, and much higher in the early stage of the memory layer formation.

[Example 5]

The experiment was conducted in the same manner as in Example 2 except that Kr was used in place of Ar as the introduction gas in the inversed sputtering. The surface roughness Ra regarding the switching layer after the inversed sputtering was found to be 1.515 nm.

The magnetic layer of the obtained magneto-optical disk was annealed by laser at the groove face in order to divide it into tracks magnetically.

With the resulting magneto-optical disk, recording was conducted continuously on the land face thereof by ordinary field-modulation system at a mark length of 0.05 µm, and a pit interval of 0.10 µm. The recorded information was reproduced by the technique of "Enlarging Reproduction Process of Magnetic Domain Displacement Type Utilizing Temperature Gradient in Magnetic Layer" disclosed by the inventors of the present invention (Japanese Patent Application Laid-Open No. 6-290496). The reproduction was conducted with an optical system of a wavelength of 680 nm and NA of 0.6 (relative speed 2 m/s) at a C/N value of 39.0 dB with high reproducibility.

As described above, use of gaseous Kr in the inversed sputtering in place of Ar as the introduction gas increased the effect of roughening the layer surface, and improved the recording domain preservability in comparison with Ar.

[Example 6]

The experiment was conducted in the same manner as in Example 2 except that Xe was used in place of Ar as the introduction gas in the inversed sputtering in Example 2.

The surface roughness Ra after the inversed sputtering was found to be 1.520 nm.

The magnetic layer of the obtained magneto-optical disk was annealed by laser at the groove face in order to divide it into tracks magnetically.

With the resulting magneto-optical disc, recording was conducted continuously on the land face thereof by ordinary field-modulation system at a mark length of 0.05 µm, and a pit interval of 0.10 µm. The recorded information was reproduced by the technique of "Enlarging Reproduction Process of Magnetic Domain Displacement Type Utilizing Temperature Gradient in Magnetic Layer" disclosed by the inventors of the present invention (Japanese Patent Application Laid-Open No. 6-290496). The reproduction was conducted with an optical system of a wavelength of 680 nm and NA of 0.6 (relative speed 2 m/s) at a C/N value of 39.0 dB with high reproducibility.

As described above, use of gaseous Xe in the inversed sputtering in place of Ar as the introduction gas increased the effect of roughening the substrate surface, and improved the recording domain preservability in comparison with Ar.

[Example 7]

The experiment was conducted in the same manner as in Example 2 except that ion beam milling was practiced in place of the inversed sputtering regarding the switching layer to roughen the surface before the memory layer formation. The other conditions were the same as in Example 2.

The ion beam milling was practiced at a beam current density of 0.5 mA/cm$^2$ with the input voltage of 500 V. The surface roughness Ra after the ion beam milling was 1.455 nm.

The magnetic layer of the obtained magneto-optical disk was annealed by laser at the groove face in order to divide it into tracks magnetically.

With the resulting magneto-optical disk, recording was conducted continuously on the land face thereof by ordinary field-modulation system at a mark length of 0.05 μm, and a pit interval of 0.10 μm. The recorded information was reproduced by the technique of "Enlarging Reproduction Process of Magnetic Domain Displacement Type Utilizing Temperature Gradient in Magnetic Layer" disclosed by the inventors of the present invention (Japanese Patent Application Laid-Open No. 6-290496). The reproduction was conducted with an optical system of a wavelength of 680 nm and NA of 0.6 (relative speed 2 m/s) at a C/N value of 39.5 dB with high reproducibility.

As described above, the coercivity and the recording domain preservability of the memory layer were improved by roughening the layer surface by ion beam milling before formation of the memory layer.

[Example 8]

Figure 2:
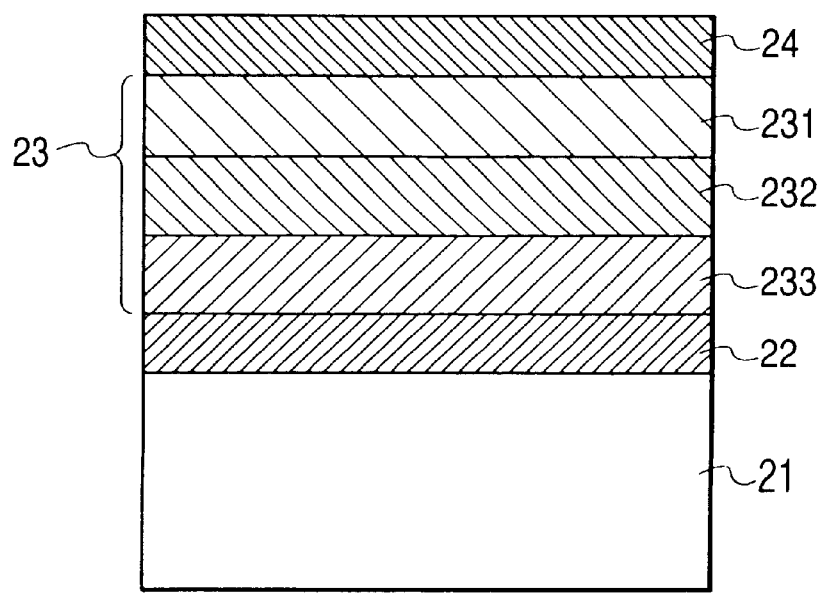
FIG. 2 is a schematic sectional view showing layer constitution of the magneto-optical medium employed in Example 8 of the present invention.

On the same substrate as the one employed in Example 1, the magnetic layers (3 layers) were formed in the reverse order. FIG. 2 illustrates schematically the sectional constitution of the medium.

In FIG. 2, polycarbonate substrate 21 is a land-and-groove type substrate, as in Example 1, having a land width of 0.6 μm, a groove width of 0.6 μm, and a channel depth of 85 nm. The surface roughness Ra of the land portion of substrate 21 was found to be 1.250 nm.

On substrate 21, were formed successively an SiN layer as a first dielectric layer (interference layer) 22 in a thickness of 80 nm, a TbFeCoCr layer as a third magnetic layer (memory layer) 233 in a thickness of 80 nm, TbFeCr layer as a second magnetic layer (switching layer) 232 in a thickness of 10 nm by sputtering. As a result, almost the same surface roughness as the surface roughness Ra of the land portion of substrate 21 appeared on the surface of the second magnetic layer. The surface of the second magnetic layer was treated by inversed sputtering at an input power of 100 W for 5 minutes to change the surface roughness to 0.855 nm.

Thereon, were formed successively a GdFeCr layer as a first magnetic layer (domain wall displacement layer) 231 in a thickness of 30 nm, and an SiN layer as a second dielectric layer (protection layer) 24 in a thickness of 60 nm by sputtering. In this Example, magnetic layer 23 was comprised of three layers 231 to 233.

In such a manner, a medium was formed in which the memory layer has a surface roughness larger than that of the displacement layer.

The medium of this Example has the magnetic layers (3 layers) formed on the substrate in the reverse order in comparison with the medium of Example 1. Usually, an optical head is placed on the substrate side of the magneto-optical disk, and a magnetic head is placed on the magnetic layer side thereof. However, with this magneto-optical disk, the arrangement reverse thereof is preferred. In other words, the optical head is preferably placed on the magnetic layer side to detect reproduction signal directly from the reproduction layer (in the usual arrangement, on reproduction, signals from the memory layer are simultaneously read out), in consideration of the quality of the reproduction signals.

The magnetic layer of the obtained magneto-optical disk was annealed by laser at the groove face in order to divide it into tracks magnetically.

With the resulting magneto-optical disk, recording was conducted continuously on the land face thereof by ordinary field-modulation system at a mark length of 0.05 μm, and a pit interval of 0.10 μm. The recorded information was reproduced by the technique of "Enlarging Reproduction Process of Magnetic Domain Displacement Type Utilizing Temperature Gradient in Magnetic Layer" disclosed by the inventors of the present invention (Japanese Patent Application Laid-Open No. 6-290496). The reproduction was conducted with an optical system of a wavelength of 680 nm and NA of 0.6 (relative speed 2 m/s) at a C/N value of 39.0 dB with high reproducibility.

As described above, marks of as fine as 0.05 μm in mark length could be recorded and reproduced readily and stably by forming firstly a memory layer on a rough substrate (roughness: 1.2 nm or more) and smoothening the layer surface (to roughness of 1.2 nm or less) by inversed sputtering before formation of the displacement layer.

In other words, the small surface roughness (not more than 1.2 nm) of the displacement layer facilitates the displacement of the domain walls, and the large surface roughness of the memory layer improves the coercivity of the memory layer to improve preservability of the recorded domains.

What is claimed is:

1. A magneto-optical medium comprising
   a light-transmissive substrate;
   a third magnetic layer formed on the light-transmissive substrate;
   a first magnetic layer formed on the light-transmissive substrate, the first magnetic layer having lower domain wall coercivity and allowing higher domain wall mobility than the third magnetic layer at or around an ambient temperature; and
   a second magnetic layer held between the first magnetic layer and the third magnetic layer, the second magnetic layer having a Curie temperature lower than that of the first magnetic layer and the third magnetic layer, wherein the surface roughness, Ra(d), of the first magnetic layer is smaller than the surface roughness, Ra(m), of the third magnetic layer.

2. The magneto-optical medium according to claim 1, wherein the surface roughness Ra(m) of the third magnetic layer is not less than 1.2 nm.

3. The magneto-optical medium according to claim 2, wherein the surface roughness Ra(d) of the first magnetic layer is not more than 1.2 nm.

4. The magneto-optical medium according to claim 1, wherein the surface roughness Ra(d) of the first magnetic layer is not more then 1.2 nm.

5. A process for producing the magneto-optical medium set forth in any of claims 1 to 3 comprising the steps of:
   forming the first magnetic layer on a light-transmissive substrate,
   forming the second magnetic layer on the first magnetic layer, roughening the surface of the second magnetic layer, and forming the third magnetic layer on the surface-roughened second magnetic layer.

6. The process for producing the magneto-optical medium according to claim 5, wherein the step of roughening the surface of the second magnetic layer is conducted by inversed sputtering.

7. The process for producing the magneto-optical medium according to claim 5, wherein the step of roughening the surface of the second magnetic layer is conducted by ion beam milling.

8. A magneto-optical medium comprising:

a light-transmissive substrate;

a first magnetic layer formed on the light-transmissive substrate, the first magnetic layer capable of magnetic domain wall displacement therein;

a third magnetic layer for storing information, formed on the light-transmissive substrate; and a second magnetic layer provided between the first magnetic layer and the third magnetic layer having a Curie temperature lower than that of the first magnetic layer and the third magnetic layer, wherein the surface roughness, Ra(d), of the first magnetic layer is smaller than the surface roughness, Ra(m), of the third magnetic layer.

9. The magneto-optical medium according to claim 8, wherein the surface roughness Ra(m) of the third magnetic layer is not less than 1.2 nm.

10. The magneto-optical medium according to claim 8, wherein the surface roughness Ra(d) of the first magnetic layer is not more than 1.2 nm.

11. The magneto-optical medium according to claim 9, wherein the surface roughness Ra(d) of the first magnetic layer is not more than 1.2 nm.

* * * * *